United States Patent
Dämon et al.

(10) Patent No.: US 9,972,872 B2
(45) Date of Patent: May 15, 2018

(54) BATTERY SYSTEM

(71) Applicant: SAMSUNG SDI CO., LTD., Yongin-si, Gyeonggi-do (KR)

(72) Inventors: Peter Dämon, Laßnitzhöhe (AT); Georg Eichberger, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 637 days.

(21) Appl. No.: 14/077,089

(22) Filed: Nov. 11, 2013

(65) Prior Publication Data
US 2014/0134469 A1    May 15, 2014

(30) Foreign Application Priority Data
Nov. 12, 2012 (EP) ................................ 12192300

(51) Int. Cl.
 *H01M 10/625* (2014.01)
 *H01M 10/63* (2014.01)
 *H01M 10/6567* (2014.01)
 *H01M 2/10* (2006.01)
 *H01M 10/613* (2014.01)

(52) U.S. Cl.
 CPC ....... *H01M 10/502* (2013.01); *H01M 2/1077* (2013.01); *H01M 10/625* (2015.04); *H01M 10/63* (2015.04); *H01M 10/6567* (2015.04); *H01M 10/613* (2015.04)

(58) Field of Classification Search
 CPC ........... H01M 10/613; H01M 10/0413; H01M 10/0481; H01M 10/625
 See application file for complete search history.

(56) References Cited

U.S. PATENT DOCUMENTS

| | | | | |
|---|---|---|---|---|
| 4,367,271 A * | 1/1983 | Hasegawa | ................. | D21H 5/12 162/146 |
| 6,308,728 B1 * | 10/2001 | Frazier | ..................... | G01M 3/04 137/15.11 |
| 6,432,575 B1 * | 8/2002 | Yamagami | .............. | H01M 2/34 429/100 |
| 2003/0116888 A1 * | 6/2003 | Rymer | .............. | A61F 13/15626 264/460 |
| 2005/0026014 A1 * | 2/2005 | Fogaing | .................. | H01M 2/00 429/437 |

(Continued)

FOREIGN PATENT DOCUMENTS

| CN | 102640320 A | 8/2012 |
|---|---|---|
| DE | 102009052508 A1 | 5/2011 |

(Continued)

OTHER PUBLICATIONS

Merriam-Webster Wall.*

(Continued)

*Primary Examiner* — Sarah A. Slifka
*Assistant Examiner* — Brian R Ohara
(74) *Attorney, Agent, or Firm* — Lewis Roca Rothgerber Christie LLP

(57) ABSTRACT

A battery system having at least one battery cell, an absorption element, and a temperature-control system having a liquid temperature-control medium configured to cool and/or heat the battery cells in a battery housing, and a motor vehicle having such a battery system.

19 Claims, 2 Drawing Sheets

(56) References Cited

U.S. PATENT DOCUMENTS

| | | | | |
|---|---|---|---|---|
| 2006/0022634 A1* | 2/2006 | Nomura | ............... | C09D 175/16 320/107 |
| 2007/0134521 A1* | 6/2007 | Thanner | ............ | H01M 8/04007 429/423 |
| 2007/0292723 A1* | 12/2007 | Ikeda | .................... | H01M 2/105 429/7 |
| 2009/0142628 A1* | 6/2009 | Okada | ................. | H01M 2/0237 429/8 |
| 2011/0290554 A1* | 12/2011 | Bogner | ............... | H01M 2/1094 174/547 |
| 2011/0300428 A1* | 12/2011 | Sohn | ................... | H01M 2/1066 429/120 |
| 2012/0219839 A1* | 8/2012 | Kritzer | .................... | H01M 2/10 429/120 |
| 2013/0022845 A1* | 1/2013 | Davis | ................. | H01M 2/0277 429/72 |

FOREIGN PATENT DOCUMENTS

| | | |
|---|---|---|
| DE | 102010010844 A1 | 9/2011 |
| DE | 102010022327 A1 | 12/2011 |
| WO | 2011082226 A2 | 7/2011 |

OTHER PUBLICATIONS

SIPO Office action dated Jul. 21, 2015, with English translation, for Chinese Patent application 2013105520915, (14 pages).
SIPO Office action dated Jan. 15, 2016, with English translation, for Chinese Patent application 201310552091.5, (12 pages).

\* cited by examiner

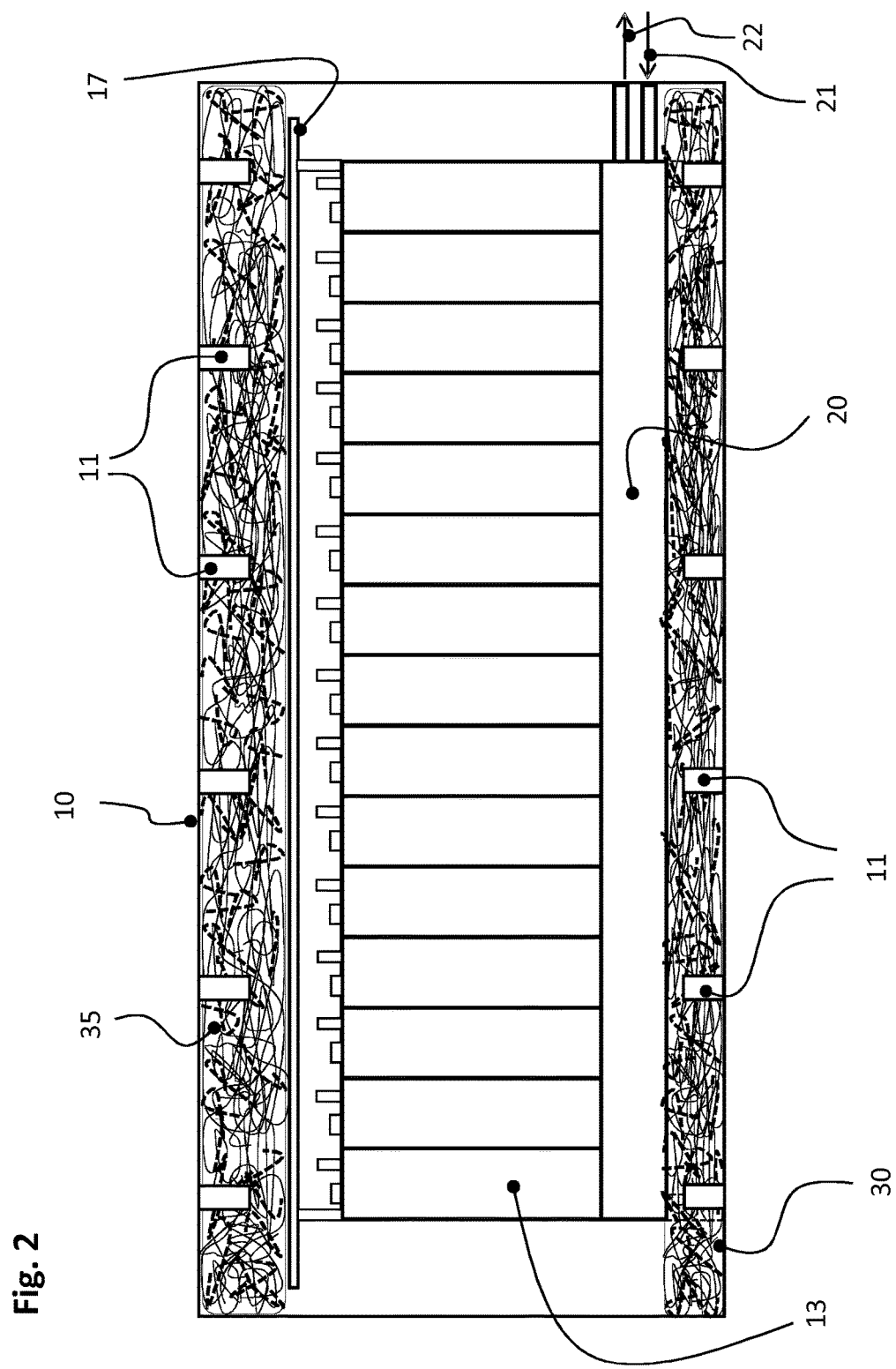

BATTERY SYSTEM

CROSS-REFERENCE TO RELATED APPLICATIONS

The present application claims priority 35 U.S.C. § 119 to European Patent Publication No. EP 12192300.7 (filed on Nov. 12, 2012), which is hereby incorporated by reference in its entirety.

TECHNICAL FIELD

Embodiments relate to a battery system having at least one battery cell, an absorption element, and a temperature-control system having a liquid temperature-control medium configured to cool and/or heat the battery cells in a battery housing, and to a motor vehicle having such a battery system.

BACKGROUND

Battery systems having a plurality of battery cells are used, in particular, as energy stores for a drive of electric and hybrid vehicles. In order to ensure an optimum function of the energy store, it is necessary to keep the temperature of the battery cells in a desired operating range. In order to prevent the operating temperature being exceeded and/or undershot, active or passive temperature-control systems are used. The use of liquid temperature-control medium with a high thermal capacity has proven itself particularly, which temperature-control medium is guided along the battery cells in a satisfactorily thermally conducting manner, in a heat exchanger.

It is a problem, however, in the case, for example, of an accident of a vehicle which is equipped in this way. Leaks, and therefore, the discharge of the temperature-control medium from the cooling element may occur. The temperature-control medium may then pass into direct contact with the battery cells and, as a result of its conductivity, may cause a short circuit, for example.

A battery system is known from German Patent Publication No. DE 10 2010 010 844 A1. The battery system which is disclosed therein describes a storage module for voltage supply, in particular of a vehicle with a number of storage cells which in each case have a first and a second connector terminal of different polarity and a valve. The storage cells are connected electrically via the connector terminals to form the storage module. An internal pressure which is present in a storage cell may be dissipated and electrolyte may be discharged from the storage cell via a respective valve.

The storage cells of the storage module which is described have a valve in the form of a predetermined break point. This predetermined break point makes it possible for excess electrolyte to be discharged from the interior of the storage cell in the case of ageing of the storage cell. Since the electrolyte which is used in storage cells is usually electrically conducting, this may lead to short-circuits within the storage module and the function of the entire storage module may no longer be ensured.

Conventional devices are not suitable for binding large amounts of temperature-control medium which are discharged from a temperature-control system in the interior of a closed battery housing in the case of damage, and thus, are not suitable for effectively preventing damage to battery systems and cells.

SUMMARY

Embodiments relate to an enhanced battery system(s) with increased operational security and, in particular, having a simple and inexpensive structural configuration which is relatively insusceptible to faults.

Embodiments relate to motor vehicles having an enhanced battery system(s).

In accordance with embodiments, a battery system may include at least one of: battery cells, a temperature-control system having a liquid temperature-control medium configured to cool and/or heat the battery cells in a battery housing, at least one absorption element configured to receive the liquid temperature-control medium and which is arranged spatially between the battery cells and the battery housing and composed of a nonwoven material having an average area-related mass of from 250 to 700 $g/m^2$ with at least two different fibre types, at least one of the fibre types being a supporting fibre and at least one other of the fibre types being an absorption fibre.

In accordance with embodiments, a battery system for a motor vehicle may include at least one of: at least one battery module and at least one battery system operatively connected to the at least one battery module. Among other things, the crash behaviour of the motor vehicle is enhanced and the risk of resulting damage (for example, short-circuit, fire) of a collision is reduced.

In accordance with embodiments, a battery system may include at least one of: a battery housing; battery cells in the battery housing; a temperature-control system having a liquid temperature-control medium configured to cooling and/or heat the battery cells in the battery housing; and at least one absorption element arranged between the battery cells and the battery housing and configured to absorb any of the liquid temperature-control medium discharged from the temperature-control system, wherein the at least one absorption element is composed of a non-woven material including fibres of at least two different fibre types, at least one of the at least two fibre types being a supporting fibre and at least one other of the fibre types being an absorption fibre; and wherein the non-woven material has an average area-related mass in a range between 250 to 700 $g/m^2$.

In accordance with embodiments, a battery system may include at least one of: a plurality of battery cells; a temperature-control system configured to permit a flow of a liquid temperature-control medium to at least one of cool and heat the battery cells; and an absorption element composed of a supporting fibre and an absorption fibre and which is arranged adjacent to the battery cells and configured to absorb and bind any of the liquid temperature-control medium discharged from the temperature-control system.

In accordance with embodiments, a battery system for a motor vehicle may include at least one of: a battery system that includes a battery housing; battery cells in the battery housing; a temperature-control system having a liquid temperature-control medium configured to cooling and/or heat the battery cells in the battery housing; and at least one absorption element arranged between the battery cells and the battery housing and configured to absorb any of the liquid temperature-control medium discharged from the temperature-control system, wherein the at least one absorption element is composed of a non-woven material including fibres of at least two different fibre types, at least one of the at least two fibre types being a supporting fibre and at least one other of the fibre types being an absorption fibre; and wherein the non-woven material has an average area-related mass in a range between 250 to 700 g/m².

The result is thus an absorption element which is firstly particularly elastic as a result of the effect of the supporting fibre and secondly has a high absorbent capacity as a result of the action of the absorption fibre.

In order that the battery system of a vehicle is not damaged in an accident, a battery housing in accordance with embodiments may be of correspondingly rigid and stable configuration. In order to achieve this, the battery housing may include beads, ribs and other reinforcing devices. In the case of a suitable position, liquid temperature-control medium which is discharged may pass into depressions and intermediate spaces which are formed by the reinforcing geometry. On account of their compact construction, non-woven materials of conventional construction are incapable of filling the intermediate spaces and depressions in such a way that discharged liquid temperature-control medium may be absorbed reliably. If discharged liquid temperature-control medium remains in the intermediate spaces and depressions, undesired flows may occur within the battery system in the case of a corresponding position of the vehicle. Electrochemical reactions, for example, the decomposition of water with the release of hydrogen, or else short-circuit flows with local overheating are possible consequences.

In accordance with embodiments, the absorption element may have an average area-related mass in a range between 300 to 450 g/m².

In accordance with embodiments, in the absorption element, the weight proportion of the supporting fibre may be in a range between 1% and 40% and the weight proportion of the absorption fibre may be in a range between 60% and 99%.

In accordance with embodiments, the weight proportion of the supporting fibre may be in a range between 2% and 30% and the weight proportion of the absorption fibre may be in a range between 70% and 98%. The weight proportion of the supporting fibre may be kept low by way of the use of a suitable elastic material for the supporting fibre. A high weight proportion of absorption fibres brings about a high absorption capacity of the nonwoven in accordance with embodiments.

In accordance with embodiments, in an unloaded state, the absorption element may have an overall height in a range between 3 mm to 40 mm. In accordance with embodiments, an unloaded state denotes a state in which the absorption element is neither pressed mechanically nor loaded with liquid temperature-control medium. An optimum overall height in the unloaded state may be considered in conjunction with a desired degree of pressing of the absorption element.

In accordance with embodiments, in an unloaded state, the absorption element may have an overall height in a range between 3 mm to 10 mm. Advantageously, a particularly space-saving overall design of battery systems results in tight installation spaces, low overall heights proving advantageous, once again in conjunction with a desired degree of pressing of the absorption element.

In accordance with embodiments, the absorption element may have a reduced overall height in certain sections thereof. Thus, local differences of the cavities which are provided in the battery housing may be compensated for with a simultaneously optimum degree of pressing of the nonwoven.

In accordance with embodiments, certain sections of the absorption element with a reduced overall height in the unloaded state may have the same density as sections of the absorption element with a non-reduced overall height. This advantageously achieves a situation where there is an optimum degree of pressing for a defined composition of the nonwoven everywhere in a manner which is adapted to the spatial conditions in the battery housing (e.g., beads, ribs, etc).

In accordance with embodiments, sections of the absorption element with a reduced overall height in the unloaded state may have the same area-related mass as sections of the absorption element with a non-reduced overall height. The sections of the absorption element which have a higher density are subjected to correspondingly adapted pressing between the battery housing and the battery cells during installation into the battery system. The sections which have a higher density are preferably already formed during the production of the absorption element, for example, by way of a corresponding mechanical and/or thermal pre-treatment. As a result of an embodiment of this type, the absorption element may be shaped in such a way that its positioning in beads, ribs and other reinforcing devices of the battery housing is simplified.

In accordance with embodiments, the absorption element may be arranged in an elastically pressed manner between the battery housing and the battery cells, the degree of pressing being in a range between 1% to 80%. Alternatively, the degree of pressing may be in a range between 10% to 50%. The elastic pressing of the absorption element advantageously causes the absorption element to be held reliably in a desired position in the battery system without further fastening devices. The structural forming of one or more absorption elements of the battery system may take place, for example, in such a way that the absorption elements are held in their position in the battery housing by way of shaped-out mouldings of the battery housing and/or by other components. The mounting of the absorption elements is also simplified substantially as a result.

An excessively high degree of pressing limits the absorbing capacity of the absorption element and impedes the distribution of locally discharged liquid temperature-control medium over the entire nonwoven which is available in the interior of the battery housing. An optimum value for the degree of pressing is determined in each case empirically in tests for a defined composition of the nonwoven, and the absorption element is then dimensioned correspondingly.

The absorption fibre may be configured to bind liquid temperature-control medium in a pressure-resistant manner. To this end, the absorption fibre in accordance with embodiments may have "absorbing elements." In accordance with embodiments, "absorbing elements" are understood as elements which are suitable for binding liquid in a pressure-resistant manner. Here, the binding may take place not only by way of simple adhesion, but rather, for example, by way of an ion-dipole interaction between the liquid and the "absorbing elements." As a consequence, a liquid which is absorbed by the "absorbing elements" is no longer discharged regardless of the spatial position of the nonwoven. Conventional absorbent materials (woven fabrics, etc.) may bind a liquid merely in a non-pressure-resistant manner. For example, in the case of a deliberate change in the spatial position of an absorbent material, the liquid which was first of all absorbed would be discharged again at least partially.

The battery system in accordance with embodiments may be configured in such a way that the absorption element bears directly against the battery housing, at least in sections. As a result of the arrangement of the absorption element directly on the battery housing at least in sections, that is to say on the inner wall of the battery housing, firstly the pressure which is required for the elastic pressing is produced, and secondly it is ensured as a result that the liquid temperature-control medium which is discharged in the case of leaks and collects in depressions, for example, between beads and/or ribs may be absorbed reliably.

The operational safety of battery systems is enhanced by way of the proposed embodiments and measures.

DRAWINGS

Embodiments will be illustrated by way of example in the drawings and explained in the description below.

FIG. 2 illustrates a diagrammatic sectional illustration of a battery system with two absorption elements and beads/ribs in the battery housing, in accordance with embodiments.

DESCRIPTION

Figure 1:
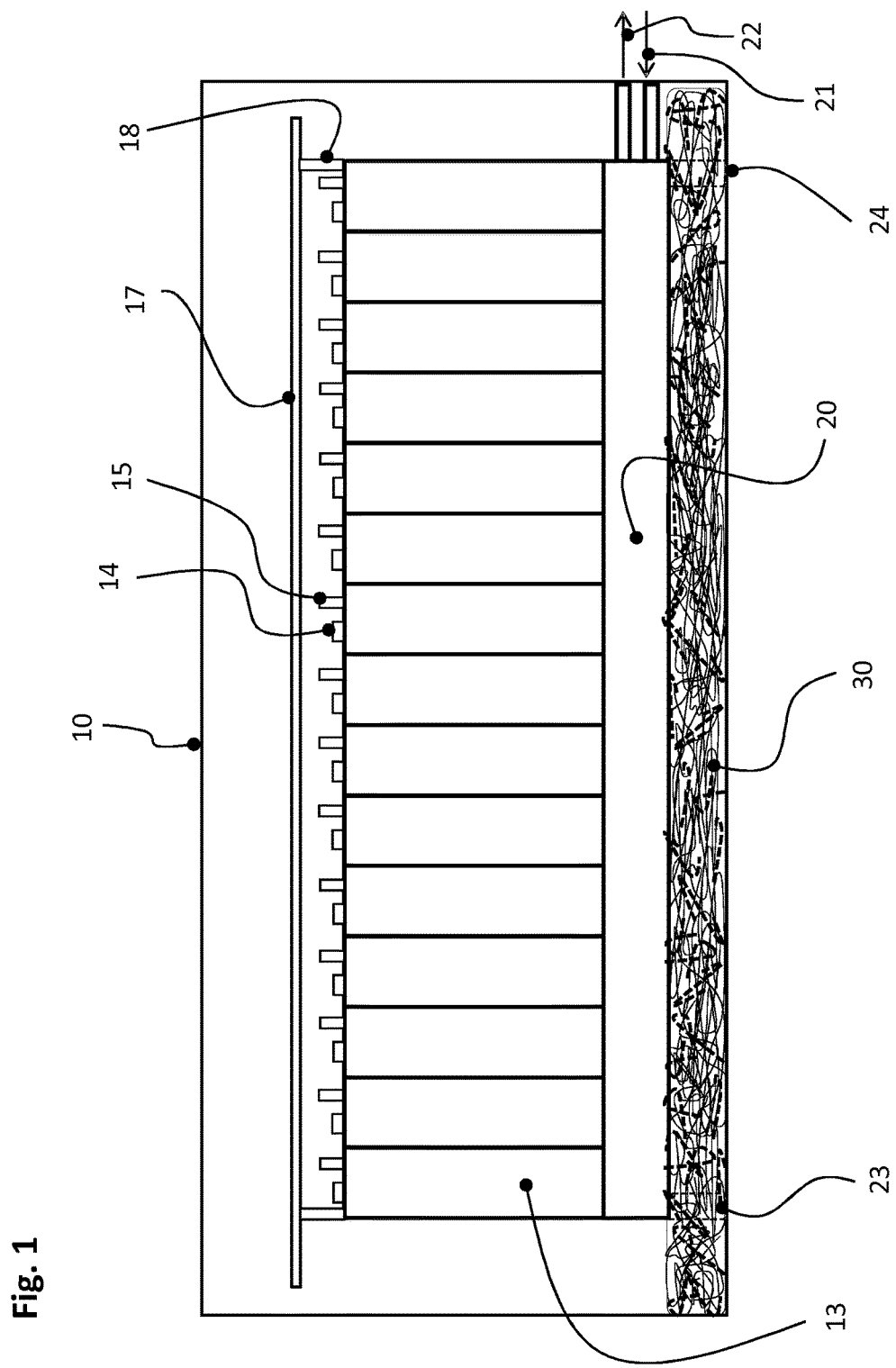
FIG. 1 illustrates a diagrammatic sectional illustration of a battery system in with an absorption element on the bottom of the battery housing, in accordance with embodiments.

As illustrated in FIG. 1, a battery system in accordance with embodiments includes a plurality of battery cells 13, each battery cell having or otherwise operatively connected to cell poles 14, 15. At one side of the plurality of battery cells 13 is a cell monitoring unit 17 is arranged adjacent to the cell poles 14, 15 on spacer elements 18 in such a way that it spans the entirety of the plurality of battery cells 13. The cell monitoring unit 17 may have devices configured to monitor operational characteristics of the battery cells 13, such as, for example, the cell voltages and/or the temperature of individual battery cells (for example, voltage tapping elements and/or temperature sensors). The battery cells 13 may be operatively connected to, or in communication with one another via cell connectors. On a side of the battery cells 13 which is opposite to the cell monitoring unit 17 is a temperature-control block 20 having an inlet opening 21 and an outlet opening 22, each configured to permit the flow of a liquid temperature-control medium which is temperature-controlled by an external control device. The battery cells 13 may are arranged on and/or over the temperature-control block 20 in such a way that the temperature-control block 20 acts as a heat exchanger between the battery cells 13 and the liquid temperature-control medium. The temperature-control block 20 may be connected fixedly to the battery housing 10 via carrier elements 23, 24. An absorption element 30 is arranged on the bottom of the battery housing 10 between the battery housing 10 and the temperature-control block 20. The absorption element 30 may be configured to absorb and bind the liquid temperature-control medium which is discharged from the temperature-control block 20 in the case, for example, of damage.

As illustrated in FIG. 2, an example of a battery system having multiple absorption elements 30, 35. As in FIG. 1, the temperature-control block 20 has an inlet opening 21 and an outlet opening 22 configured to permit the flow of a liquid temperature-control medium which is temperature-controlled by an external control device. For mechanical reinforcement, the battery housing 10 may have a plurality of mechanical reinforcing elements 11, such as, for example, beads, ribs, webs, etc. An absorption element 30 may be arranged in the lower region of the battery housing 10 and may also have a reduced overall height in the region of the reinforcing elements 11. This advantageously ensures that the liquid temperature-control medium which is discharged locally at one area/region may be distributed over the lower absorption element 30 and the existing absorption capacity of the lower absorption element may thus be utilized fully.

A second absorption element 35 may be arranged in an upper region of the battery system between the cell monitoring unit 17 and the inner wall of the battery housing 10. This advantageously ensures that any liquid temperature-control medium which is discharged is absorbed reliably in a motor vehicle which comes to rest on its roof in an accident. Corresponding additional absorption elements 35 may also be provided on the inside of the side walls of the battery housing 10 and in other cavities in the interior of the battery housing to further enhance the safety features.

The absorption element(s) 30, 35 may have an average area-related mass in a range between 300 to 450 g/m$^2$. In the absorption element(s) 30, 35, the weight proportion of the supporting fibre may be in a range between 1% and 40% and the weight proportion of the absorption fibre may be in a range between 60% and 99%. Alternatively, the weight proportion of the supporting fibre may be in a range between 2% and 30% and the weight proportion of the absorption fibre may be in a range between 70% and 98%. The weight proportion of the supporting fibre may be kept low by way of the use of a suitable elastic material for the supporting fibre. A high weight proportion of absorption fibres brings about a high absorption capacity of the nonwoven in accordance with embodiments.

In an unloaded state, the absorption element(s) 30, 35 may have an overall height in a range between 3 mm to 40 mm. An unloaded state in accordance with embodiments denotes a state in which the absorption element(s) 30, 35 is neither pressed mechanically nor loaded with liquid temperature-control medium. An optimum overall height in the unloaded state may be considered in conjunction with a desired degree of pressing of the absorption element(s) 30, 35.

In an unloaded state, the absorption element(s) 30, 35 may have an overall height in a range between 3 mm to 10 mm. Advantageously, a particularly space-saving overall design of battery systems results in tight installation spaces, low overall heights proving advantageous, once again in conjunction with a desired degree of pressing of the absorption element(s) 30, 35.

The absorption element(s) 30, 35 may have a reduced overall height in certain sections thereof. Thus, local differences of the cavities which are provided in the battery housing 10 may be compensated for with a simultaneously optimum degree of pressing of the nonwoven.

Certain sections of the absorption element(s) 30, 35 with a reduced overall height in the unloaded state may have the same density as sections of the absorption element(s) 30, 35 with a non-reduced overall height. This advantageously achieves a situation where there is an optimum degree of pressing for a defined composition of the nonwoven everywhere in a manner which is adapted to the spatial conditions in the battery housing 10 (e.g., beads, ribs, etc).

Sections of the absorption element(s) 30, 35 with a reduced overall height in the unloaded state may have the same area-related mass as sections of the absorption element(s) 30, with a non-reduced overall height. The sections of the absorption element(s) 30, 35 which have a higher density are subjected to correspondingly adapted pressing between the battery housing 10 and the battery cells 13 during installation into the battery system. The sections which have a higher density already formed during the production of the absorption element(s) 30, 35, for example, by way of a corresponding mechanical and/or thermal pre-treatment. As a result of an embodiment of this type, the absorption element(s) 30, 35 may be shaped in such a way that its positioning in beads, ribs and other reinforcing devices 11 of the battery housing 10 is simplified.

The absorption element(s) 30, 35 may be arranged in an elastically pressed manner between the battery housing 10 and the battery cells 13, the degree of pressing being in a range between 1% to 80%. Alternatively, the degree of pressing may be in a range between 10% to 50%. The elastic pressing of the absorption element(s) 30, 35 advantageously causes the absorption element(s) 30, 35 to be held reliably in a desired position in the battery system without further fastening devices. The structural forming of one or more absorption element(s) 30, 35 of the battery system may take place, for example, in such a way that the absorption element(s) 30, 35 are held in their position in the battery housing 10 by way of shaped-out mouldings of the battery housing 10 and/or by other components. The mounting of the absorption element(s) 30, 35 is also simplified substantially as a result.

An excessively high degree of pressing limits the absorbing capacity of the absorption element(s) 30, 35 and impedes the distribution of locally discharged liquid temperature-control medium over the entire non-woven material which is available in the interior of the battery housing 10. An optimum value for the degree of pressing is determined in each case empirically in tests for a defined composition of the nonwoven, and the absorption element(s) 30, 35 is then dimensioned correspondingly.

The absorption fibre may be configured to bind liquid temperature-control medium in a pressure-resistant manner. To this end, the absorption fibre in accordance with embodiments may have "absorbing elements." In accordance with embodiments, "absorbing elements" are understood as elements which are suitable for binding liquid in a pressure-resistant manner. Here, the binding may take place not only by way of simple adhesion, but rather, for example, by way of an ion-dipole interaction between the liquid and the "absorbing elements." As a consequence, a liquid which is absorbed by the "absorbing elements" is no longer discharged regardless of the spatial position of the nonwoven. Conventional absorbent materials (woven fabrics, etc.) may bind a liquid merely in a non-pressure-resistant manner. For example, in the case of a deliberate change in the spatial position of an absorbent material, the liquid which was first of all absorbed would be discharged again at least partially.

The battery system in accordance with embodiments may be configured in such a way that the absorption element(s) 30, 35 bear(s) directly against the battery housing 10, at least in sections. As a result of the arrangement of the absorption element(s) 30, 35 directly on the battery housing 10 at least in sections, that is to say on the inner wall of the battery housing 10, firstly the pressure which is required for the elastic pressing is produced, and secondly it is ensured as a result that the liquid temperature-control medium which is discharged in the case of leaks and collects in depressions, for example, between beads and/or ribs may be absorbed reliably.

The claimed ranges for area-related mass and/or density were determined empirically in test series with different nonwoven compositions and indicate an average area-related mass (or density) in the unloaded state (that is to say, unloaded with temperature-control medium and non-pressed).

A battery system in accordance with the invention comprises at least one battery module. A battery module comprises a plurality of battery cells (or electrochemical storage cells). If the battery system comprises more than one battery module, each battery module may either have a dedicated temperature-control block, or all battery modules utilize a common temperature-control block. Each battery module also usually comprises a cell monitoring unit which is arranged in the immediate vicinity of the cell poles of the battery cells.

In accordance with embodiments, the designation of vehicle includes, for example, motor vehicles, rail vehicles, and also watercraft and aircraft. All of the pressure values stated are by way of example and do not in any way limit the invention and the pressure range for which embodiments is claimed.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

10 Battery housing
11 Reinforcing elements (beads, webs, ribs)
13 Battery cell
14, 15 Cell poles
17 Cell monitoring unit
18 Spacer element
20 Temperature-control block/heat exchanger
21 Inlet opening
22 Outlet opening
23, 24 Carrier elements
30 First (lower) absorption element
35 Second (upper) absorption element

What is claimed is:
1. A battery system comprising:
 a battery housing;
 a battery module in the battery housing, the battery module having a plurality of battery cells arranged along a first direction;
 a temperature-control system comprising a temperature-control block, the temperature-control block being in direct contact with the battery cells, and through which a liquid temperature-control medium configured to cool and/or heat the battery cells passes; and
 an absorption element arranged between the temperature-control block and the battery housing and being configured to absorb a liquid temperature-control medium discharged from the temperature-control system, wherein the battery module, the temperature-control block, and the absorption element are arranged in a second direction and the temperature-control block is arranged between the battery module and the absorption element,
 wherein the absorption element extends beyond an edge of the temperature-control block in the first direction and is in fluid communication with the battery cells,
 wherein the absorption element is composed of a non-woven material including at least two different fiber types, at least one of the fiber types being an elastic supporting fiber and at least another of the fiber types being an absorption fiber, wherein the non-woven material has an average mass per unit area between 250 and 700 grams per square meter ($g/m^2$), and wherein a weight proportion of the elastic supporting fiber is between 1% and 40%, and a weight proportion of the absorption fiber is between 60% and 99%.

2. The battery system of claim 1, wherein the non-woven material has an average mass per unit area between 300 and 450 grams per square meter.

3. The battery system of claim 1, wherein:
a weight proportion of the elastic supporting fiber is between 2% and 30%; and
a weight proportion of the absorption fiber is between 70% and 98%.

4. The battery system of claim 1, wherein, in an unloaded state, the absorption element has an overall height between 3 millimeters and 40 millimeters.

5. The battery system of claim 1, wherein, in an unloaded state, the absorption element has an overall height between 3 millimeters and 10 millimeters.

6. The battery system of claim 1, wherein the absorption element has a reduced overall height in sections thereof.

7. The battery system of claim 6, wherein the sections of the absorption element with the reduced overall height in an unloaded state have a same density as other sections of the absorption element with a non-reduced overall height.

8. The battery system of claim 6, wherein the sections of the absorption element with the reduced overall height in an unloaded state have a same mass per unit area as other sections of the absorption element with a non-reduced overall height.

9. The battery system of claim 1, wherein the absorption element is arranged in an elastically pressed manner between the battery housing and the battery cells, the amount of elastic pressing being between 1% and 80%.

10. The battery system of claim 1, wherein the absorption element is arranged in an elastically pressed manner between the battery housing and the battery cells, the amount of elastic pressing being between 10% and 50%.

11. The battery system of claim 1, wherein the absorption fiber is configured to bind the liquid temperature-control medium in a pressure-resistant manner.

12. The battery system of claim 1, wherein the absorption element directly abuts against the battery housing at least in sections thereof.

13. A motor vehicle comprising a battery system, the battery system comprising:
a battery housing;
a battery module in the battery housing, the battery module having a plurality of battery cells arranged along a first direction;
a temperature-control system comprising a temperature-control block, the temperature-control block being in direct contact with the battery cells, and through which a liquid temperature-control medium configured to cool and/or heat the battery cells passes; and
an absorption element arranged between the temperature-control block and the battery housing and configured to absorb a liquid temperature-control medium discharged from the temperature-control system, wherein the battery module, the temperature-control block, and the absorption element are arranged in a second direction and the temperature-control block is arranged between the battery module and the absorption element, wherein the absorption element extends beyond an edge of the temperature-control block in the first direction and is in fluid communication with the battery cells, wherein the absorption element is composed of a non-woven material including fibers of at least two different fiber types, at least one of the fiber types being an elastic supporting fiber and at least another of the fiber types being an absorption fiber, wherein the non-woven material has an average mass per unit area between 250 and 700 grams per square meter ($g/m^2$), and wherein a weight proportion of the elastic supporting fiber is between 1% and 40%, and a weight proportion of the absorption fiber is between 60% and 99%.

14. The motor vehicle of claim 13, wherein the absorption element has a reduced overall height in sections thereof.

15. The motor vehicle of claim 14, wherein the sections of the absorption element with the reduced overall height in an unloaded state have a same density as sections of the absorption element with a non-reduced overall height.

16. The motor vehicle of claim 14, wherein the sections of the absorption element with the reduced overall height in an unloaded state have a same mass per unit area as sections of the absorption element with a non-reduced overall height.

17. The motor vehicle of claim 13, wherein the absorption element is arranged in an elastically pressed manner between the battery housing and the battery cells, the amount of elastic pressing being between 1% and 80%.

18. The motor vehicle of claim 13, wherein the absorption element directly abuts against the battery housing at least in sections thereof.

19. A battery system comprising:
a battery housing comprising a plurality of inwardly extending reinforcing elements;
a battery module in the battery housing, the battery module having a plurality of battery cells arranged along a first direction;
a temperature-control system comprising a temperature-control block being configured to permit flow of a liquid temperature-control medium therethrough to cool and/or heat the battery cells; and
an absorption element being arranged adjacent to the temperature-control block and being configured to absorb and bind a liquid temperature-control medium discharged from the temperature-control system, wherein the battery module, the temperature-control block, and the absorption element are arranged in a second direction and the temperature-control block is arranged between the battery module and the absorption element, wherein the absorption element has a reduced overall height in sections that are between the reinforcing elements and the temperature-control block, the sections of the absorption element with the reduced overall height having a same density as other sections of the absorption element that are between adjacent ones of the reinforcing elements, wherein the absorption element extends beyond an edge of the temperature-control block in the first direction and is in fluid communication with the battery cells, wherein the absorption element is composed of a non-woven material including at least two different fiber types, at least one of the fiber types being an elastic supporting fiber and at least another of the fiber types being an absorption fiber, wherein the non-woven material has an average mass per unit area between 250 and 700 grams per square meter (g/m²), and wherein a weight proportion of the elastic supporting fiber is between 1% and 40%, and a weight proportion of the absorption fiber is between 60% and 99%.

* * * * *